United States Patent
Hiroyuki et al.

(10) Patent No.: US 7,273,436 B2
(45) Date of Patent: Sep. 25, 2007

(54) PLANETARY-ROLLER-TYPE CONTINUOUSLY VARIABLE TRANSMISSION

(75) Inventors: Sonobe Hiroyuki, Nagoya (JP);
Shiotsu Isamu, Nagoya (JP);
Hirayama Takayoshi, Nagoya (JP)

(73) Assignee: Mitsubishi Heavy Industries Inc., Tokyo (JP)

( * ) Notice: Subject to any disclaimer, the term of this patent is extended or adjusted under 35 U.S.C. 154(b) by 35 days.

(21) Appl. No.: 10/995,251

(22) Filed: Nov. 24, 2004

(65) Prior Publication Data

US 2005/0277514 A1 Dec. 15, 2005

(30) Foreign Application Priority Data

Jun. 10, 2004 (JP) .............................. 2004-173019

(51) Int. Cl.
*F16H 13/06* (2006.01)
(52) U.S. Cl. ........................... 475/183; 475/7; 475/903
(58) Field of Classification Search ................... 475/7, 475/149, 183, 185, 5, 903; *F16H 3/72*
See application file for complete search history.

(56) References Cited

U.S. PATENT DOCUMENTS

| | | | | |
|---|---|---|---|---|
| 2,528,753 | A * | 11/1950 | Jessup | 451/397 |
| 5,415,595 | A * | 5/1995 | Nelson | 475/7 |
| 6,379,276 | B1 * | 4/2002 | Cheng | 475/4 |
| 6,837,824 | B2 * | 1/2005 | Reimann et al. | 475/343 |
| 2003/0094329 | A1 | 5/2003 | Ogawa et al. | |

FOREIGN PATENT DOCUMENTS

| | | | |
|---|---|---|---|
| DE | 19509577 A1 | 9/1995 | |
| DE | 29502981 U1 | 8/1996 | |
| EP | 1561972 A1 | 8/2005 | |
| JP | 2363646 A | 6/1974 | |
| JP | 50-109359 A | 8/1975 | |
| JP | 55-126148 A | 9/1980 | |
| JP | 55126148 A * | 9/1980 | 475/7 |
| JP | 56-12162 U | 2/1981 | |
| JP | 60-34553 A | 2/1985 | |
| JP | 1-139161 U | 9/1989 | |
| JP | 4-87881 A | 3/1992 | |
| JP | 4-56250 U | 5/1992 | |
| JP | 6-67147 U | 9/1994 | |
| JP | 8-334519 A | 12/1996 | |

(Continued)

*Primary Examiner*—Charles A. Marmor
*Assistant Examiner*—Justin K. Holmes
(74) *Attorney, Agent, or Firm*—Birch, Stewart, Kolasch & Birch, LLP

(57) ABSTRACT

Fine adjustment of the rotation speed ratio or intentional control of the rotation speed ratio is carried out, centered on a desired speed ratio, including 1:1, for the rotation speed ratio between an input shaft and an output shaft. A planetary-roller speed-increasing mechanism whose input shaft is a carrier and whose output shaft is a sun roller, a planetary-roller speed-reduction mechanism whose input shaft is a sun roller and whose output shaft is a carrier, and a worm speed-changing mechanism for rotationally driving a roller ring in contact with planetary rollers of the planetary-roller speed reduction mechanism are provided in a housing. The output shaft of the planetary-roller speed-increasing mechanism and the input shaft of the planetary-roller speed-reduction mechanism are linked.

8 Claims, 3 Drawing Sheets

FOREIGN PATENT DOCUMENTS

| | | | |
|---|---|---|---|
| JP | 2538139 Y2 | | 3/1997 |
| JP | 9-155473 A | | 6/1997 |
| JP | 2000-205358 A | | 7/2000 |
| JP | 2000205358 A | * | 7/2000 |
| JP | 2001-59556 A | | 3/2001 |
| JP | 2001-124161 A | | 5/2001 |
| JP | 2002-61727 A | | 2/2002 |
| JP | 2002061727 A | * | 2/2002 |
| JP | 2002-213566 A | | 7/2002 |
| JP | 2003-154951 A | | 5/2003 |
| JP | 2004-58896 A | | 2/2004 |

* cited by examiner

PLANETARY-ROLLER-TYPE CONTINUOUSLY VARIABLE TRANSMISSION

BACKGROUND OF THE INVENTION

1. Field of the Invention

The present invention relates to planetary-roller-type continuously variable transmissions disposed between a driving mechanism and a mechanism being driven, and also relates to planetary-roller-type continuously variable transmissions suitable for use in cases where the rotation speed ratio of the output shaft to the input shaft thereof is minutely adjusted or intentionally controlled, centered around a predetermined speed ratio, including 1:1.

This application is based on patent application No. 2004-173019 filed in Japan, the content of which is incorporated herein by reference.

2. Description of Related Art

Until now, there has been a great demand for continuously variable transmissions. For example, in the case where the driving mechanism is an electric motor, when changes occur in the operating environment, such as the voltage supplied to the electric motor, it may not be possible to obtain the predetermined rotation speed ratio between the output shaft of the electric motor and the input shaft of the mechanism being driven. In such an event, it is necessary to adjust the rotation speed ratio by means of a mechanical adjuster.

Also, when winding threads in spinning mills, the length of the circumference for winding up the thread changes as thread winding proceeds, and therefore, it is necessary to adjust the thread winding speed. As means to solve these problems, apparatuses such as chain-type continuously variable transmissions have been used.

In recent years, it has become necessary to carry out rotation speed ratio adjustment in the fields of printing presses, measurement instruments, vehicular steering systems, and so on, and there have been demands for high-quality power transmission devices producing low noise and having compactness, extremely low backlash, extremely low rotation variation, high efficiency, high reliability, and so on.

An example of this type of technology is given in Japanese Patent Application Publication No. 2004-58896, which discloses a steering apparatus including a differential transmission mechanism in a steer-by-wire system.

BRIEF SUMMARY OF THE INVENTION

A continuously variable transmission has the requirements listed below.

1) The speed ratio (rotation speed ratio) of the output shaft to the input shaft should have a standard rotation speed ratio of 1:1, corresponding to the case where both axes are directly connected, or a standard speed ratio set to any arbitrary ratio, as necessary.

2) It is desirable to have a power transmission device that can increase and decrease the rotation speed ratio within a relatively small range depending on the operating conditions, for example, reducing the rotation speed ratio in the event of the rotation speed of the input shaft becoming too large, or increasing the rotation speed ratio in the event of the rotation speed of the input shaft becoming too small.

3) The speed-changing operation of the continuously variable transmission should be carried out electrically based on an instruction from a control apparatus, but in the event of a fault, such as a break in a line of the electrical system, it must return to the standard rotation speed ratio without losing the mechanical connection.

4) A large relative displacement must not occur between the input and output axes even if a large overload occurs in the continuously variable transmission or if slippage occurs between members, such as the rollers, used in the power transmission inside the continuously variable transmission.

5) Play must be reduced when the speed is shifted increasingly or decreasingly by the continuously variable transmission, and the accuracy of the speed-changing operation must be improved.

6) The components of the continuously variable transmission should be compactly combined in a single housing as a unit.

7) A high-quality power transmission producing low noise and having high rigidity, high efficiency, extremely low angular transmission error, and extremely low backlash should be realized.

It is an object of the present invention to provide an electrically operated compact continuously variable transmission that can overcome the problems described above.

In order to overcome the problems described above, a planetary-roller-type continuously variable transmission according to the present invention adopts the following means.

A planetary-roller-type continuously variable transmission according to the present invention includes a planetary-roller speed-increasing mechanism whose input shaft is a carrier and whose output shaft is a sun roller; a planetary-roller speed-reduction mechanism whose input shaft is a sun roller and whose output shaft is a carrier; and a roller ring driving mechanism for rotationally driving a roller ring which is in contact with planetary rollers of the planetary-roller mechanism positioned at the output side from among the planetary-roller speed-increasing mechanism and the planetary-roller speed-reduction mechanism. The output shaft of the planetary-roller speed-increasing mechanism and the input shaft of the planetary-roller speed-reduction mechanism are linked, or the output shaft of the planetary-roller speed reduction mechanism and the input shaft of the planetary-roller speed-increasing mechanism are linked.

In this planetary-roller-type continuously variable transmission, by rotating a roller ring with a roller ring driving mechanism, a desired speed ratio between an input shaft and an output shaft can be obtained without steps. When the roller ring is not rotated, a standard rotation speed ratio defined by the speed-increasing ratio of the planetary-roller speed-increasing mechanism and the speed-reduction ratio of the planetary-roller speed-reduction mechanism can be obtained.

In this planetary-roller-type continuously variable transmission, since the planetary-roller speed-increasing mechanism, the planetary-roller speed-reduction mechanism, and the roller ring driving mechanism are combined and provided in a single housing, a compact structure can be realized.

In this planetary-roller-type continuously variable transmission, since torque transmission is carried out by means of frictional force via rollers, the driving power transmission can be carried out quietly and smoothly, and in the case of reciprocating motion, play is reduced and the responsiveness is improved.

In this planetary-roller-type continuously variable transmission, the output shaft of the planetary-roller speed-increasing mechanism and the input shaft of the planetary-roller speed-reduction mechanism are linked, and, in the case where a roller ring driving mechanism is provided at the planetary-roller speed-reduction mechanism side, after applying a speed changing operation by means of the roller ring driving mechanism in the state where the input rotation speed is increased, speed reduction is carried out by the planetary-roller speed-reduction mechanism and output; as a result, the accuracy of the speed changing operation can be improved. Furthermore, the driving motor for driving the roller-ring driving mechanism can be made more compact.

According to the present invention, the roller ring driving mechanism may be a worm speed-changing mechanism formed of a worm wheel provided on the outer circumference of the roller ring and a dual-lead worm gear, which is engaged with the worm wheel and driven by a motor.

In this planetary-roller-type continuously variable transmission, since a dual-lead worm gear is used, the backlash can be reduced, play can be reduced when the speed is shifted increasingly or decreasingly, and the accuracy of the speed-changing operation can be improved.

According to the present invention, the sun roller, the planetary rollers, and the roller rings of the planetary-roller speed-increasing mechanism and the planetary-roller speed-reduction mechanism may be geared rollers disposed along the axial direction of the rollers, whose gears have pitch circle diameters equal to the diameters of the corresponding rollers.

In this planetary-roller-type continuously variable transmission, since the sun roller, the planetary rollers, and the roller ring are geared rollers, these sun roller, planetary rollers, and roller ring can prevent an excessive rotation displacement by means of the gears, when receiving an excessive load that cannot be handled by rollers alone.

In this planetary-roller-type continuously variable transmission, the backlash of the meshed gears is actively increased so that the gear-teeth surfaces do not come into contact during normal conditions when an excessive torque is not applied, thus ensuring smooth transmission by the rollers alone.

According to the present invention, the geared roller ring may be formed of separate members including a gear section having the gear and a roller section having the roller.

In this planetary-roller-type continuously variable transmission, since the geared roller ring is formed of separate members including a gear section and a roller section, after disposing the gear section with respect to the housing, it can be assembled so as to engage with the gear of the geared planetary rollers, and thereafter, the roller section of the roller ring and the rollers of the geared planetary rollers can be assembled. Accordingly, the geared planetary rollers can be easily assembled with respect to the roller ring.

According to the present invention, the housing may be fixed by fastening members at substantially the central part in the axial direction.

Since this planetary-roller-type continuously variable transmission has a configuration in which the housing is fastened at substantially the central part, after assembling the planetary-roller speed-increasing mechanism and the planetary-roller speed-reduction mechanism in the separated housings before fastening, the separated housings can then be combined and assembled.

According to the present invention, the gear section and the roller section of the geared roller ring may be fixed in a state wherein outer splines provided on the outer circumference thereof are engaged with inner splines provided on the inner circumference of the housing.

In this planetary-roller-type continuously variable transmission, since the roller ring and the housing are fixed using splines, movement or deformation is allowed in the radial direction of the roller ring The worm wheel of the worm speed-changing mechanism may be rotatably supported by means of bearings at both ends on the inner diameter side, at the housing and the carrier outer circumference, respectively.

In this planetary-roller-type continuously variable transmission, the worm wheel can be compactly housed.

The sun rollers of the planetary-roller speed-increasing mechanism and the planetary-roller speed-reduction mechanism may each be provided with a journal part at one end and a spline shaft part at the other end; and, by means of a sleeve which supports both journal parts with bearings provided at the centers of the carriers and in which both spline shaft parts form a spline hub, the output shaft of the planetary-roller speed-increasing mechanism and the input shaft of the planetary-roller speed-reduction mechanism may be linked, or the output shaft of the planetary-roller speed-reduction mechanism and the input shaft of the planetary-roller speed-increasing mechanism may be linked.

According to the planetary-roller-type continuously variable transmission of the present invention, the following advantages can be obtained.

A high-quality planetary-roller-type continuously variable transmission that realizes power transmission is provided; the continuously variable transmission is compact, produces low noise, and has high rigidity, high efficiency, and extremely low angular transmission error.

DETAILED DESCRIPTION OF THE INVENTION

An embodiment of the planetary-roller-type continuously variable transmission (hereinafter referred to as "continuously variable transmission") of the present invention will be described with reference to FIG. 1 and FIG. 2.

Figure 1:
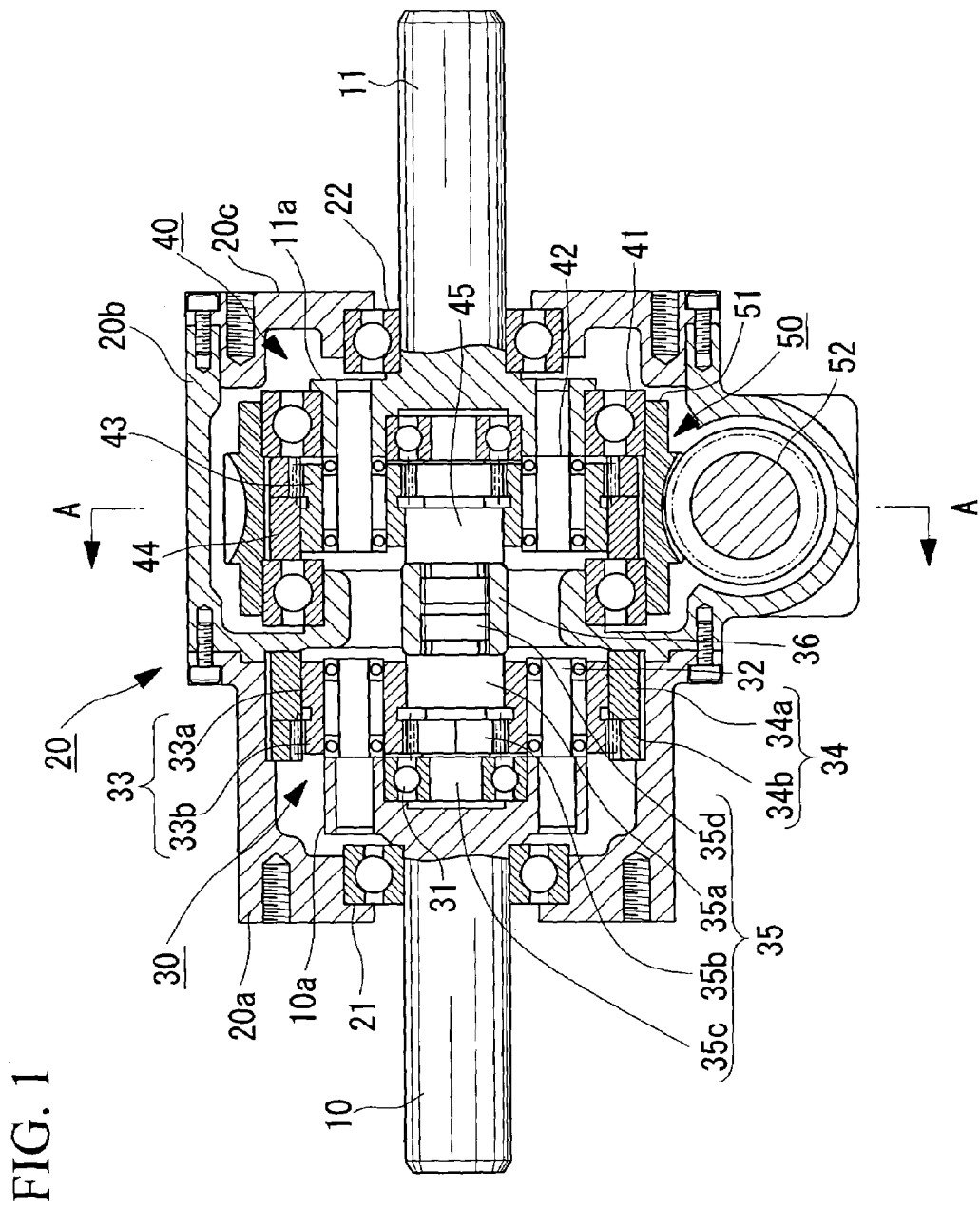
FIG. 1 is a front view (longitudinal sectional view) of the planetary-roller-type continuously variable transmission of the present invention.
Figure 2:
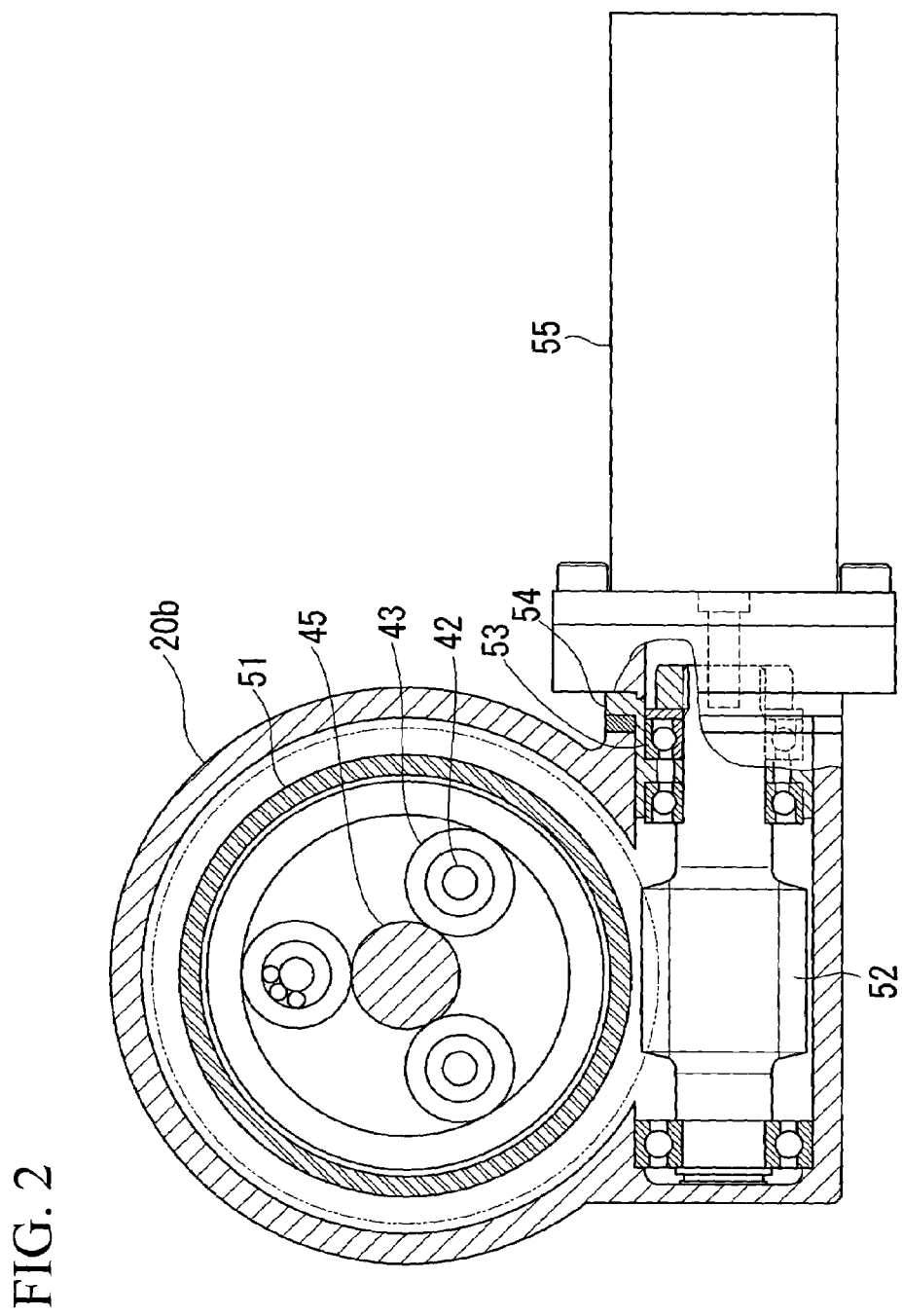
FIG. 2 is a cross-sectional view (partial exterior view) along A-A in FIG. 1.

FIG. 1 is a front view (longitudinal cross-sectional view) of the continuously variable transmission of the present embodiment, and FIG. 2 is a cross-sectional view (partial exterior view) along A-A in FIG. 1.

In both figures (referring mainly to FIG. 1), the member indicated by reference numeral 10 is an input shaft connected with a driving mechanism such as, for example, a motor, and the member indicated by reference numeral 11 is an output shaft connected to a mechanism to be driven.

The member indicated by reference numeral 20 is a substantially cylindrical housing, and this housing 20 is formed of a front housing 20a including a front wall, a rear housing 20b, and a rear cover 20c. The front housing 20a and the rear housing 20b are joined at the central part in the front-rear direction of the housing 20 with bolts (fastening members).

A planetary-roller speed-increasing mechanism 30, whose input shaft is a carrier shaft and whose output shaft is a sun shaft, is contained inside the front housing 20a.

Also, a planetary-roller speed-reduction mechanism 40, whose input shaft is a sun shaft and whose output shaft is a carrier shaft, and a worm speed-changing mechanism (roller-ring driving mechanism) 50, which is disposed outside the planetary-roller speed-reduction mechanism 40, are contained in the space defined by the rear housing 20b and the rear cover 20c.

The rear end (the right-hand side in FIG. 1) of the input shaft 10 is inserted inside the front housing 20a, and forms a thick circular-plate-shaped carrier 10a. A bearing 31 is disposed inside a hole formed in the central part at the rear end of the carrier 10a. Also, a plurality of (three in the drawing) planetary pins 32 are provided vertically on the outer circumference of the carrier 10a towards the rear.

Planetary rollers 33 are rotatably supported on the planetary pins 32 via bearings, and these planetary rollers 33 constitute a geared roller including a flat gear (hereinafter simply referred to as "gear") 33b integrally formed next to a roller (roller unit) 33a along the axial direction. As shown in the drawing, the gears 33b are preferably formed integrally with the rollers 33, but they may be formed separately so as to be rotatable with respect to the rollers 33a.

The backlash of these gears 33b with respect to mating gears 34b with which they engage is actively increased. With this arrangement, the tooth surfaces do not make contact under normal conditions where excessive torque is not applied, and smooth power transmission with only the rollers 33a is thus possible. With this type of gear, the backlash between these gears 33b and a gear 35b of a sun roller 35, the backlash between gears of planetary rollers 43 and a gear of a roller ring 44, and the backlash between gears of the planetary rollers 43 and a gear of a sun roller 45 at the planetary-roller speed-reduction mechanism 40 side exhibit the same effect.

The member indicated by reference numeral 34a is an inner ring (roller part) having a rolling contact surface at the inner side, which is in contact with the rollers 33a of the planetary rollers 33, and the member indicated by reference numeral 34b is an inner gear (flat gear part) which is engaged with the gears 33b; this inner ring 34a and inner gear 34b constitute a roller ring 34.

The roller ring 34 is provided with outer splines on the outer circumference thereof, which engage with inner splines provided on the inner diameter side of the front housing 20a. The inner ring 34a and the inner gear 34b constitute a separated structure that can be uncoupled in view of ease of assembly. That is to say, by configuring the geared roller ring 34 of the separate inner ring 34a and inner gear 34b, after disposing this inner gear 34b with respect to the housing 20, it can be assembled so as to engage with the gears 33b of the planetary rollers 33, and thereafter, the inner ring 34a of the roller ring 34 can be assembled. Accordingly, the geared planetary rollers 33 can be easily assembled with respect to the roller ring 34. This configuration is also applied to a planetary ring 44 of the planetary-roller speed-reduction mechanism 40.

Furthermore, the roller ring 34 restricts the relative rotary motion with respect to the front housing 20a by the outer splines provided on the outer circumference; however, some slight motion in the radial direction is allowed, thus making free elastic deformation possible. Accordingly, it can be interference-fitted to the front housing 20a, and the conventional problem of key or pin stopping and changes in rigidity occurring at some parts can be prevented.

The member indicated by reference numeral 35 is the sun roller, which is disposed concentrically with the center of the input shaft 10, and is integrally provided with a roller 35a and the gear 35b in the same way as the planetary rollers 33. A journal part 35c and a spline shaft 35d protrude at the front end and the rear end thereof, respectively.

The input shaft 10 is rotatably supported by a bearing 21, in which a journal part, disposed towards the front of the carrier 10a, is disposed in the front wall of the front housing 20a, and the roller ring 34, which is located by means of the planetary pins 32 and the planetary rollers 33.

The sun roller 35 is rotatably supported by the planetary rollers 33 and the bearing 31 which supports the journal part 35c at the front side.

The spline shaft 35d provided at the rear side of the sun roller 35 is connected to the sun roller 45 of the planetary-roller speed-reduction mechanism 40 described below by a sleeve 36 forming a spline hub.

The planetary-roller speed-reduction mechanism 40, which is a speed-reduction mechanism whose input shaft is a sun shaft and whose output shaft is a carrier shaft and which is configured in substantially the same way as the planetary-roller speed-increasing mechanism 30, is contained in the interior space defined by the rear housing 20b and the rear cover 20c symmetrically with respect to the planetary-roller speed-increasing mechanism 30. The difference is that the roller ring 44 is fixed at the inner diameter side of a worm wheel 51 of the rotatable worm speed-changing mechanism (roller ring rotating mechanism) 50 instead of being fixed to the rear housing 20b.

The front end (the left side in the drawing) of the output shaft 11 is inserted inside the rear housing 20b through the rear cover 20c, and forms a thick circular-plate-shaped wide carrier 11a. A bearing 41 is provided on the outer circumference of the carrier 11a.

Planetary pins 42, the planetary rollers 43, the roller ring 44, and the sun roller 45 are substantially the same as the members with the same names in the planetary-roller speed-increasing mechanism 30.

The output shaft 11 is rotatably supported by a bearing 22, in which a journal part, disposed towards the rear of the carrier 11a, is disposed in the rear cover 20c, and by the rear housing 20b, which is positioned by means of the planetary pins 42, the planetary rollers 43, the roller ring 44, the worm wheel 51, and the bearing 41.

The member indicated by reference numeral 51 is a worm wheel, which is rotatably supported by means of the two bearings 41 fixed at the inner diameter side thereof, one at the rear housing 20b and the other at the carrier 11b. The front side (the input side) bearing 41 is held by an arm having an L-shape in cross section, which is formed by bending the rear housing 20b from the front end thereof towards the inner circumference side, and then by bending towards the rear (the output side). The rear side (the output side) bearing 41 is held so, as to be engaged with the outer circumference of the carrier 11a so as to be at the same cross-sectional position as the planetary pins 42 inserted into the carrier 11a.

The inner diameter side of the worm wheel 51 is engaged with the outer splines, constituting the spline hub, provided on the outer circumference of the roller ring 44.

The member indicated by reference numeral 52 is a dual-lead worm gear which engages with the worm wheel 51, and the input shaft is connected with a servo motor 55 (see FIG. 2), which is fixed to the rear housing 20b. The dual-lead worm gear 52 is rotatably supported at both ends by bearings, and a thrust force applied to this dual-lead worm gear 52 is received by two opposing angular bearings 53, which are fixed at the input side. With this continuously variable transmission, the position of these two bearings 53 can be changed by means of a stepped sleeve 54, and the position of the dual-lead worm gear 52 can thus be adjusted.

Next, the operation of the continuously variable transmission with the above-described structure will be described.

When the input shaft 10 is made to rotate, the carrier 10a rotates as the same speed and the plurality of planetary pins 32 fixed to the carrier 10a revolve around the input shaft 10 at the same speed. Since the planetary rollers 33 prevent slippage between the inner ring 34a due to the frictional force generated between the inner ring 34a and the outside parts at the opposite side from the input shaft 10, they rotate around the planetary pins 32 in the opposite direction to the input shaft 10 and, by this rotation, cause the sun roller 35, which is frictionally driven, to rotate at an increased speed. The drawings show the case where the speed ratio is 4:1.

The rotation of the sun roller 35 is transmitted to the sun roller 45 as an input by means of the sleeve (spline hub) 36, is speed reduced via the planetary rollers 43 and the planetary pins 42 along the path opposite to that described above, and is transferred to the output shaft 11. If the worm speed-changing mechanism 50 is not operated, the speed ratio is 1:4, and the speed ratio of the output shaft 11 with respect to the input shaft 10 is 1:1 (standard rotation speed ratio).

When the worm speed-changing mechanism 50 is operated and the worm wheel 51 is rotated in the same direction as the input shaft 10, the rotation of the planetary rollers 43 decreases and the speed reduction ratio decreases. Also, when the worm wheel 51 is rotated in the opposite direction from the input shaft 10, the rotation of the planetary rollers 43 increases, and the speed reduction ratio increases. Thus, the rotation speed ratio of the output shaft 11 with respect to the input shaft 10 increases or decreases by an amount equal to the product of the speed of the worm wheel 51 and the speed reduction ratio.

Accordingly, since the change in speed imparted to the output shaft 11 is applied to the rotation speed of the input shaft 10 at the speed-increasing stage, which is then reduced and output, it can be accurately carried out in terms of small speed variations imparted to the output shaft 11, and at the same time, it is possible to reduce the required capacity of the servo motor 55.

Furthermore, since the worm wheel 51 of the worm speed-changing mechanism 50 has the ability to self lock (auto lock) when the power supply to the worm speed-changing mechanism 50 is cut off, the speed ratio of the continuously variable transmission automatically becomes the standard rotation speed ratio of 1:1.

Next, the operation and the advantages of the continuously variable transmission according to the present embodiment will be described.

In this continuously variable transmission, since the roller ring 44 is made to rotate by the worm speed-changing mechanism 50, any desired speed ratio can be obtained without steps.

In this continuously variable transmission, since the planetary-roller speed-increasing mechanism 30, the planetary-roller speed-reduction mechanism 40, and the worm speed-changing mechanism 50 are combined and provided in a single housing 20, a compact structure can be realized.

In this continuously variable transmission, since torque transmission is carried out by means of frictional force via the rollers 33, 34, 35, 43, 44, and 45, the driving power transmission can be carried out quietly and smoothly, and in the case of reciprocating motion, play is reduced and the responsiveness is improved.

In this continuously variable transmission, since the output shaft (sun roller 35) of the planetary-roller speed-increasing mechanism 30 and the input shaft (sun roller 45) of the planetary-roller speed-reduction mechanism 40 are linked and the worm speed-changing mechanism 50 is provided at the planetary-roller speed-reduction mechanism 40 side, after applying a speed-changing operation by means of the worm speed-changing mechanism 50 in the state where the input rotation speed is increased, speed reduction is carried out by the planetary-roller speed-reduction mechanism 40 and output, and the accuracy of the speed-changing operation can be improved. Furthermore, the servo motor 55 for driving the worm speed-changing mechanism 50 can be made more compact.

In this continuously variable transmission, since a dual-lead worm gear 52 is used, the backlash can be reduced, play can be reduced when the speed is shifted increasingly or decreasingly, and the accuracy of the speed-changing operation can be improved.

In this continuously variable transmission, since the rollers 33, 34, 35, 43, 44, and 45 used for torque transmission are geared rollers, when receiving an excessive load that cannot be handled by rollers alone, an excessive rotation displacement can be prevented by means of the gears.

In this continuously variable transmission, since the backlash of the meshed gears is actively increased so that the gear-teeth surfaces do not come into contact during normal conditions when an excessive torque is not applied, smooth transmission by the rollers alone is possible.

In this continuously variable transmission, since the geared roller ring 34 is formed of separate members including an inner ring 34a and an inner gear 34b, after disposing this inner gear 34b with respect to the housing 20, it can be assembled so as to engage the gear 33b with the end of the geared planetary rollers 33 at insertion time, and thereafter, the inner ring 34a of the roller ring 34 can be assembled. Accordingly, the geared planetary rollers 33 can be easily assembled with respect to the roller ring 34.

Since this continuously variable transmission has a configuration in which the housing 20 is fastened at substantially the central part, after assembling the planetary-roller speed-increasing mechanism 30 and the planetary-roller speed-reduction mechanism 40 in the separated housings (20a, 20b, and 20c) before fastening, both housings 20a and 20b can then be combined and assembled. Accordingly, the assembly can be simplified.

In this continuously variable transmission, since the roller ring 34 and the housing 20 are fixed using splines, movement or deformation is allowed in the radial direction of the roller ring 34.

In the present embodiment, a case has been described wherein two identical planetary-roller mechanisms, that is, a speed-increasing mechanism and a speed-reduction mechanism, oppose each other and are linked together in this order, the desired speed changing is carried out in the speed-reduction mechanism at the downstream side, and a standard rotation speed ratio of the input shaft and the output shaft of 1:1 is used when speed changing is not performed; however, the configuration may be modified as described below.

The roller diameters may be changed to obtain any desired value for a standard speed ratio other than 1:1.

Figure 3:
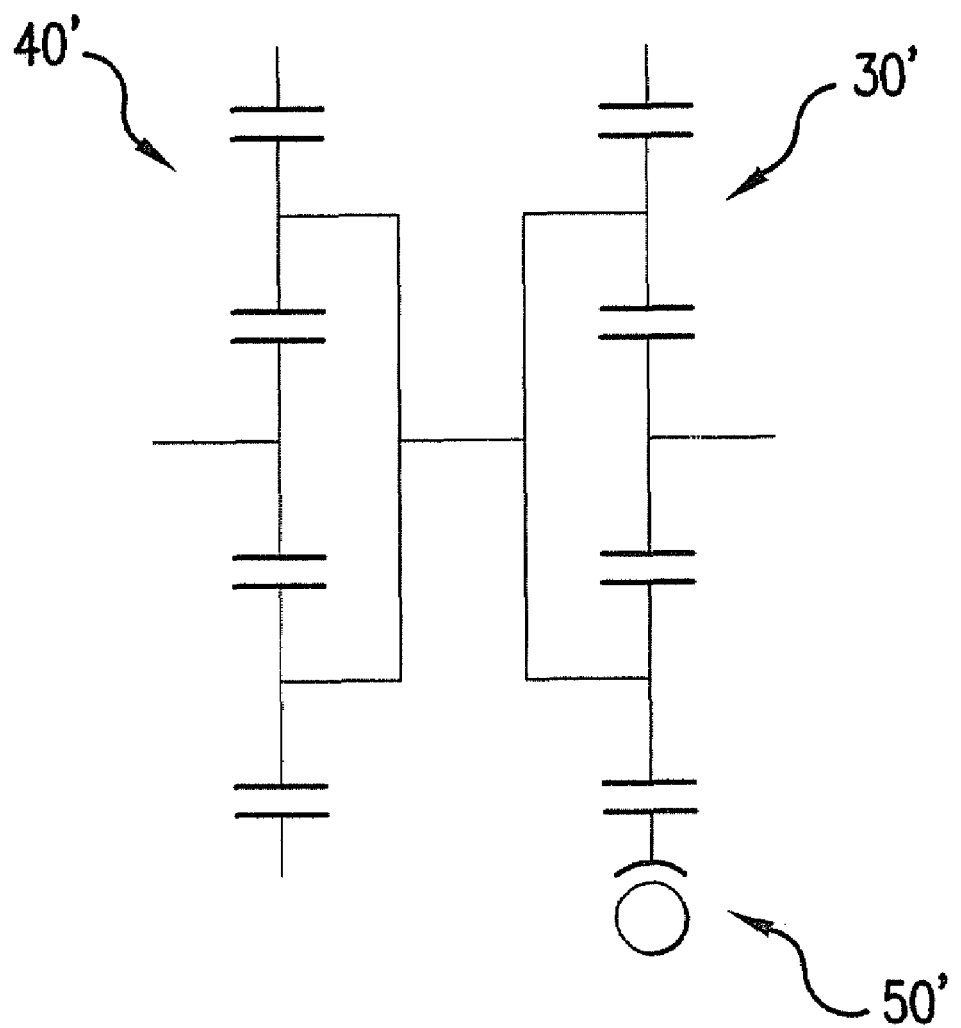
FIG. 3 is a skeleton view of a variation of the planetary-roller-type continuously variable transmission of the present invention.

Furthermore, as shown in FIG. 3, the two planetary-roller mechanisms, that is, an input-side speed-reduction mechanism 40' and an output-side speed-increasing mechanism 30', may be opposed to each other and linked in this order, and the desired speed changing may be carried out by a worm speed-changing mechanism 50' in the speed-increasing mechanism at the output side.

What is claimed is:

1. A planetary-roller-type continuously variable transmission comprising:
a planetary-roller speed-increasing mechanism whose input shaft is a carrier and whose output shaft is a sun roller;
a planetary-roller speed-reduction mechanism whose input shaft is a sun roller and whose output shaft is a carrier; and
a roller ring driving mechanism for rotationally driving a roller ring which is in contact with planetary rollers of the planetary-roller mechanism positioned at the output side from among the planetary-roller speed-increasing mechanism and the planetary-roller speed-reduction mechanism,
wherein the output shaft of the planetary-roller speed-increasing mechanism and the input shaft of the planetary-roller speed-reduction mechanism are linked, or the output shaft of the planetary-roller speed reduction mechanism and the input shaft of the planetary-roller speed-increasing mechanism are linked, and
wherein at least one of the planetary-roller speed-increasing mechanism and the planetary-roller speed-reduction mechanism includes a friction drive system that limits slippage among a planetary roller, a sun roller, and a roller ring by a frictional force generated therebetween, and
wherein the roller ring, in contact with planetary rollers of the planetary-roller mechanism positioned at the input side from among the planetary-roller speed-increasing mechanism and the planetary-roller speed-reduction mechanism, is placed in a state wherein outer splines provided on the outer circumference thereof are engaged with inner splines provided on the inner circumference of a housing and which allows a motion in the radial direction.

2. A planetary-roller-type continuously variable transmission according to claim 1, wherein the roller ring driving mechanism is a worm speed-changing mechanism formed of a worm wheel provided on the outer circumference of the roller ring and a dual-lead worm gear, which is engaged with the worm wheel and driven by a motor.

3. A planetary-roller-type continuously variable transmission according to claim 1, wherein the sun roller, the planetary rollers, and the roller rings of the planetary-roller speed-increasing mechanism and the planetary-roller speed-reduction mechanism are geared rollers disposed along the axial direction of the rollers, whose gears have pitch circle diameters equal to the diameters of the corresponding rollers.

4. A planetary-roller-type continuously variable transmission, comprising:
a planetary-roller speed-increasing mechanism whose input shaft is a carrier and whose output shaft is a sun roller;
a planetary-roller speed-reduction mechanism whose input shaft is a sun roller and whose output shaft is a carrier; and
a roller ring driving mechanism for rotationally driving a roller ring which is in contact with planetary rollers of the planetary-roller mechanism positioned at the output side from among the planetary-roller speed-increasing mechanism and the planetary-roller speed-reduction mechanism,
wherein the output shaft of the planetary-roller speed-increasing mechanism and the input shaft of the planetary-roller speed-reduction mechanism are linked, or the output shaft of the planetary-roller speed reduction mechanism and the input shaft of the planetary-roller speed-increasing mechanism are linked,
wherein the sun roller, the planetary rollers, and the roller rings of the planetary-roller speed-increasing mechanism and the planetary-roller speed-reduction mechanism are geared rollers disposed along the axial direction of the rollers, whose gears have pitch circle diameters equal to the diameters of the corresponding rollers, and
wherein the geared roller ring is formed of separate members including a gear section having a gear and a roller section having a roller, and
wherein the roller ring, in contact with planetary rollers of the planetary-roller mechanism positioned at the input side from among the planetary-roller speed-increasing mechanism and the planetary-roller speed-reduction mechanism, is placed in a state wherein outer splines provided on the outer circumference thereof are engaged with inner splines provided on the inner circumference of a housing and which allows a motion in the radial direction.

5. A planetary-roller-type continuously variable transmission according to claim 4, wherein the housing is fixed by fastening members at substantially the central part in the axial direction.

6. A planetary-roller-type continuously variable transmission according to claim 4, wherein the gear section and the roller section of the geared roller ring, which is in contact with planetary rollers of the planetary-roller mechanism positioned at the input side from among the planetary roller speed-increasing mechanism and the planetary-roller speed-reduction mechanism, are fixed in a state wherein outer splines provided on the outer circumference thereof are engaged with inner splines provided on the inner circumference of the housing.

7. A planetary-roller-type continuously variable transmission, comprising:
a planetary-roller speed-increasing mechanism whose input shaft is a carrier and whose output shaft is a sun roller;
a planetary-roller speed-reduction mechanism whose input shaft is a sun roller and whose output shaft is a carrier; and
a roller ring driving mechanism for rotationally driving a roller ring which is in contact with planetary rollers of the planetary-roller mechanism positioned at the output side from among the planetary-roller speed-increasing mechanism and the planetary-roller speed-reduction mechanism,
wherein the output shaft of the planetary-roller speed-increasing mechanism and the input shaft of the planetary-roller speed-reduction mechanism are linked, or the output shaft of the planetary-roller speed reduction mechanism and the input shaft of the planetary-roller speed-increasing mechanism are linked,
wherein the roller ring driving mechanism is a worm speed-changing mechanism formed of a worm wheel provided on the outer circumference of the roller ring and a dual-lead worm gear, which is engaged with the worm wheel and driven by a motor, and wherein the worm wheel of the worm speed-changing mechanism is rotatably supported by means of bearings at both ends on the inner diameter side, at the housing and the carrier outer circumference, respectively.

8. A planetary-roller-type continuously variable transmission, comprising:
- a planetary-roller speed-increasing mechanism whose input shaft is a carrier and whose output shaft is a sun roller;
- a planetary-roller speed-reduction mechanism whose input shaft is a sun roller and whose output shaft is a carrier; and
- a roller ring driving mechanism for rotationally driving a roller ring which is in contact with planetary rollers of the planetary-roller mechanism positioned at the output side from among the planetary-roller speed-increasing mechanism and the planetary-roller speed-reduction mechanism, wherein the output shaft of the planetary-roller speed-increasing mechanism and the input shaft of the planetary-roller speed-reduction mechanism are linked, wherein the sun rollers of the planetary-roller speed-increasing mechanism and the planetary-roller speed-reduction mechanism are each provided with a journal part at one end and a spline shaft part at the other end; and wherein, by means of a sleeve which supports both journal parts with bearings provided at the centers of the carriers and in which both spline shaft parts form a spline hub, the output shaft of the planetary-roller speed-increasing mechanism and the input shaft of the planetary-roller speed-reduction mechanism are linked.

* * * * *

UNITED STATES PATENT AND TRADEMARK OFFICE
CERTIFICATE OF CORRECTION

PATENT NO. : 7,273,436 B2  Page 1 of 1
APPLICATION NO. : 10/995251
DATED : September 25, 2007
INVENTOR(S) : Hiroyuki Sonobe et al.

It is certified that error appears in the above-identified patent and that said Letters Patent is hereby corrected as shown below:

Title page (75) the Inventors' names are incorrectly listed:

"Sonobe Hiroyuki" should read --Hiroyuki Sonobe--

"Shiotsu Isamu" should read --Isamu Shiotsu--

"Hirayama Takayoshi" should read --Takayoshi Hirayama--

Signed and Sealed this

Thirteenth Day of May, 2008

JON W. DUDAS
*Director of the United States Patent and Trademark Office*